May 9, 1944.  W. H. DEACON  2,348,612
POWER SAW
Filed Feb. 20, 1941  4 Sheets-Sheet 1
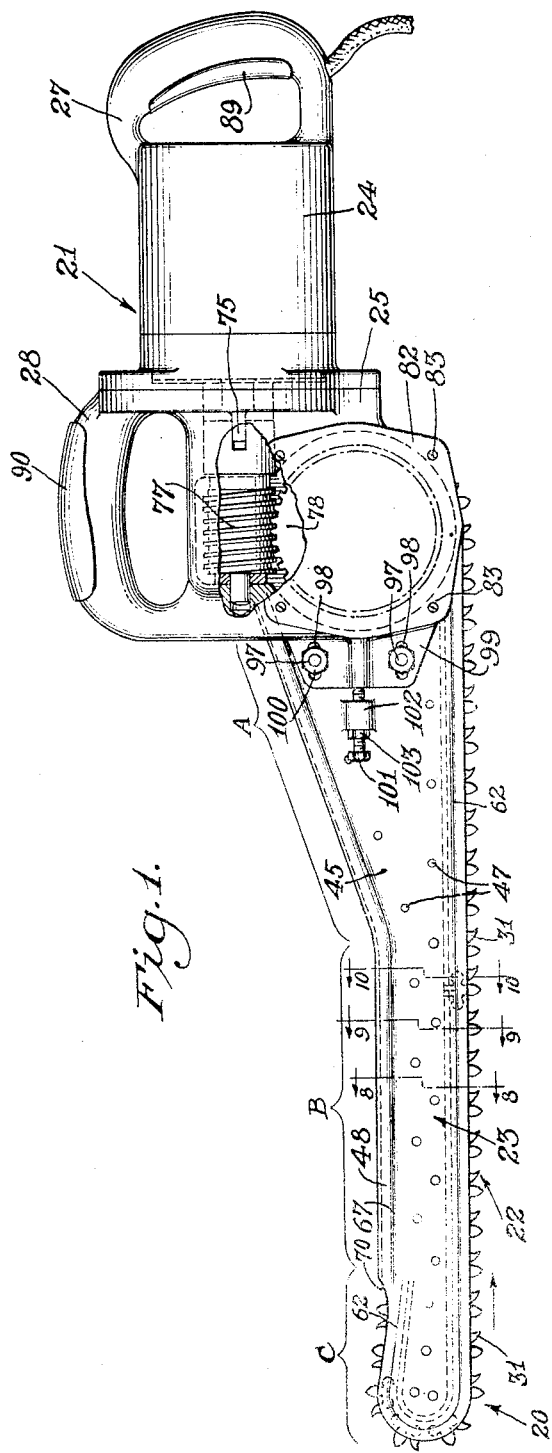
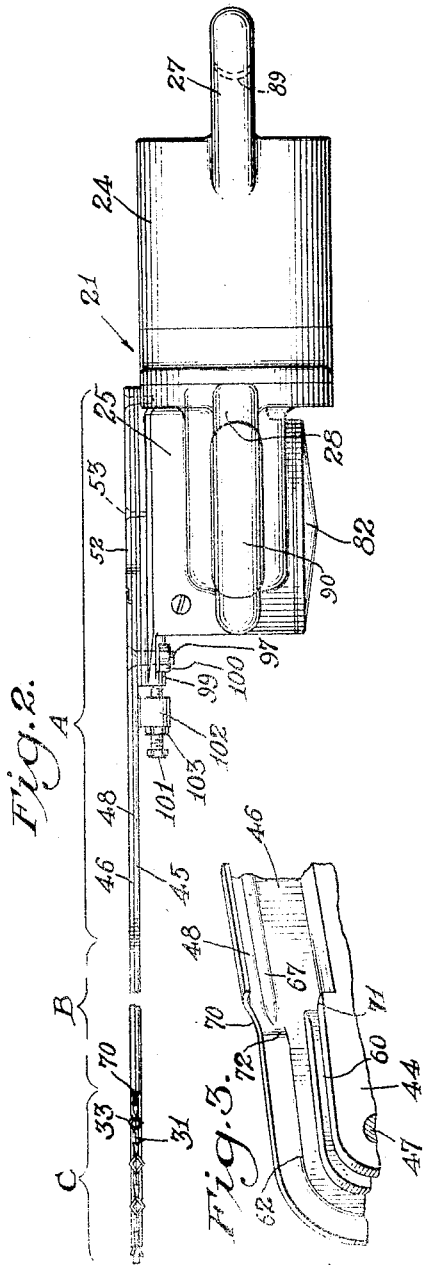
Inventor
William H. Deacon
BY
Parker, Carlson, Pitzner & Hubbard
Attorneys.

Inventor
William H. Deacon
BY
Parker, Carlson, Pitzner & Hubbard
Attorneys.

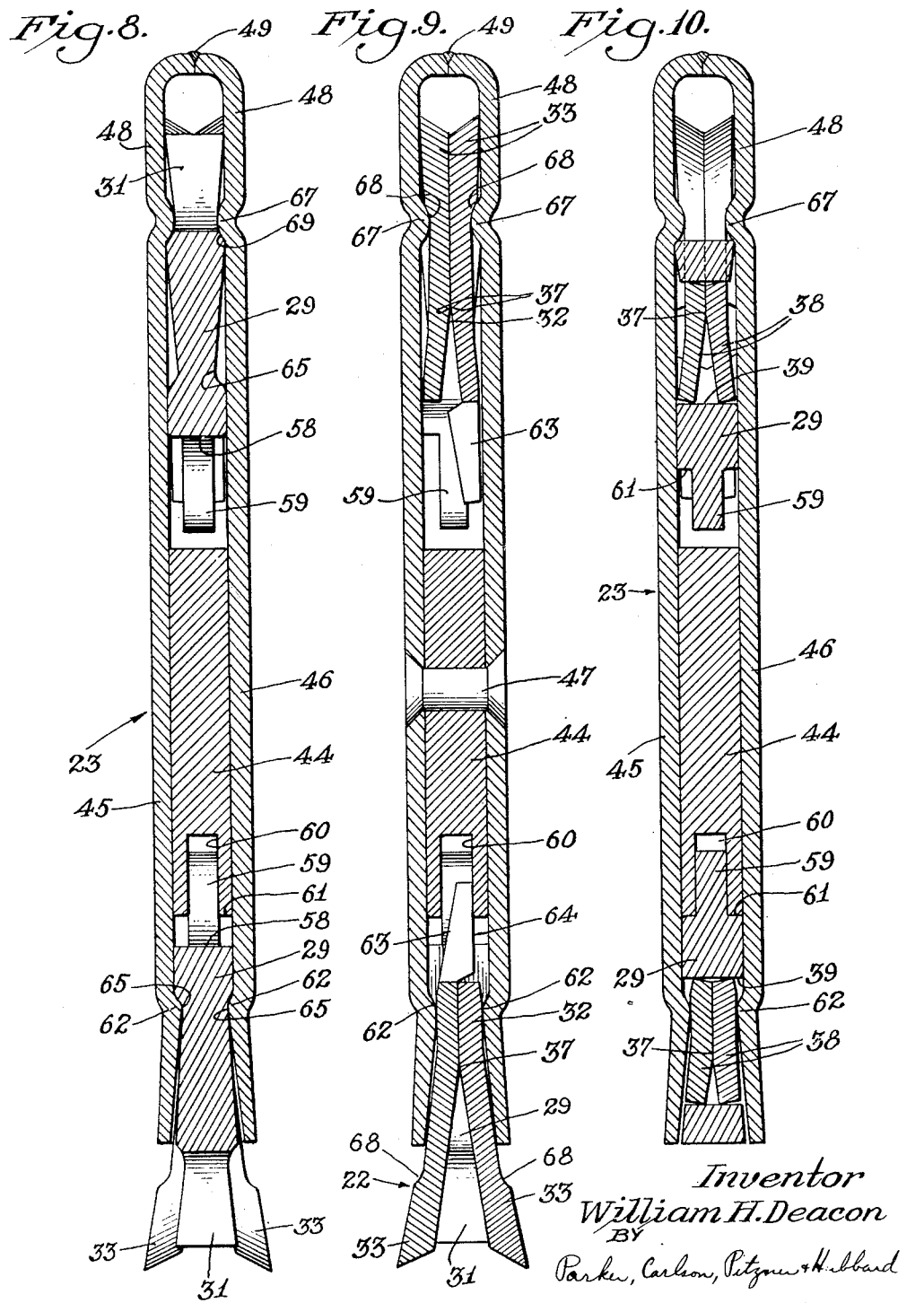

May 9, 1944. W. H. DEACON 2,348,612
POWER SAW
Filed Feb. 20, 1941 4 Sheets-Sheet 4
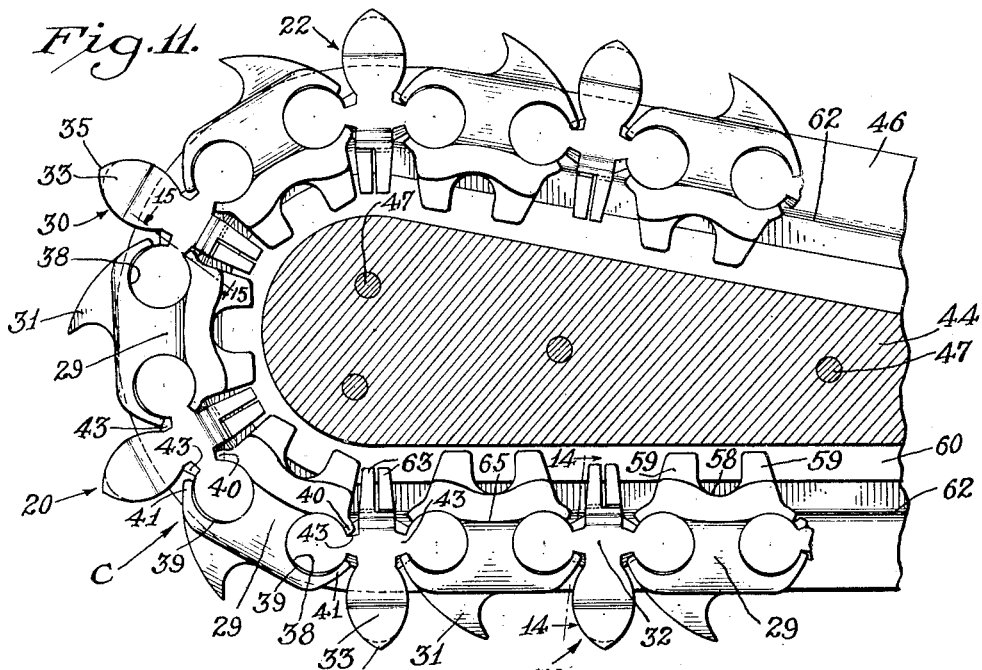
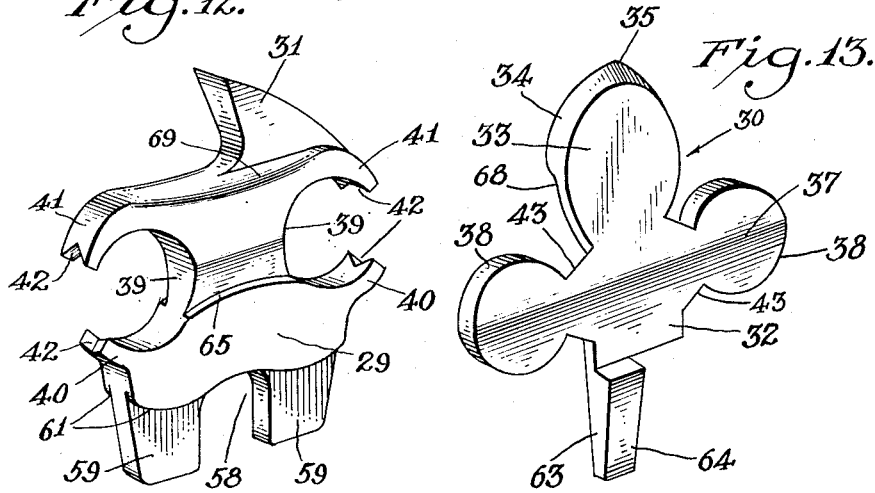
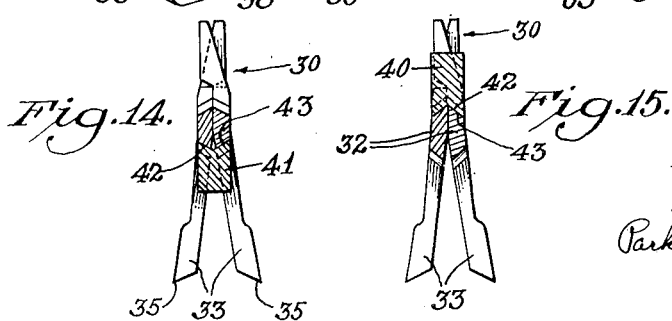
Inventor
William H. Deacon
BY
Parker, Carlson, Pitzner & Hubbard
Attorneys.

Patented May 9, 1944

2,348,612

UNITED STATES PATENT OFFICE 2,348,612

POWER SAW

William H. Deacon, Melrose Park, Ill.

Application February 20, 1941, Serial No. 379,749

17 Claims. (Cl. 143—135)

This invention relates generally to improvements in power driven saws, and more particularly relates to a novel chain type saw construction.

Theoretically, chain saws should for many purposes have considerable advantage over reciprocating, band or rotary saws. The fact remains, however, that prior chain saws have been seriously limited in usefulness. They have generally been heavy and awkward to handle, oftentimes of complicated and cumbersome construction, as well as difficult and expensive to service and repair. Some proposed constructions have actually been dangerous in use for lack of any means to retain the chain blade upon its track and prevent it from flying out in case of a break. Practically the only uses to which prior chain saws could be put have been in rough cutting stone and lumber and in felling trees. For these purposes the saws have usually been incorporated in machines of rather massive construction. Apparently the main obstacle to greater adaptability and use of the chain type of saw, and particularly for lighter types of work such as carpentry, has been the failure up to the present of any suggestion of a safe, high speed arrangement capable of embodiment in a small, reasonably fine cutting unit wherein the return portions or inactive span of the chain blade may pass through the cut or kerf in a workpiece without dragging or becoming pinched or jamming therein and stalling the saw.

The general object of the present invention is to provide an improved chain type saw in which the continuous articulated blade embodies a novel construction adapting the cutting teeth to assume a comparatively thin, closed or collapsed condition in the non-cutting or return portion of the blade so as to adequately clear the walls of a kerf cut by the saw.

Another general object is to provide an efficient, high speed chain type power saw structure which is adapted to be constructed as a lightweight unit more or less in the style of ordinary long-bladed wood cutting hand saws having the handle at one end.

Still another object of the invention is to provide an elongated chain-type hand saw which is adapted not only for ordinary straight cutting but also for endwise cutting so that holes may be cut directly in large surfaces such as panels, walls, partitions and floors or the like.

A further object of the invention is to provide a chain type saw wherein all of the articulated tooth units of the endless blade are held positively in the guideway or track for the blade even though an accidental separation or break should occur in the blade, all parts of the blade being readily accessible for repair or replacement.

Yet another object of the invention is to provide a chain type saw construction in which all but the active portion or cutting run of the blade is safely enclosed.

An additional object is to provide a power driven chain saw which is safe and reliable in operation and which may be controlled to avoid accidental driven actuation of the blade.

Other objects and advantages will become apparent in the following description and from the accompanying drawings in which:

Figure 1 is a side elevational view of a power saw embodying the features of the invention.

Fig. 2 is a fragmental top plan view of the saw.

Fig. 3 is a fragmentary enlarged sectional perspective view showing details of the blade-guiding rib arrangement at the point of transition from the closed to open condition of the cutting teeth.

Figure 4:
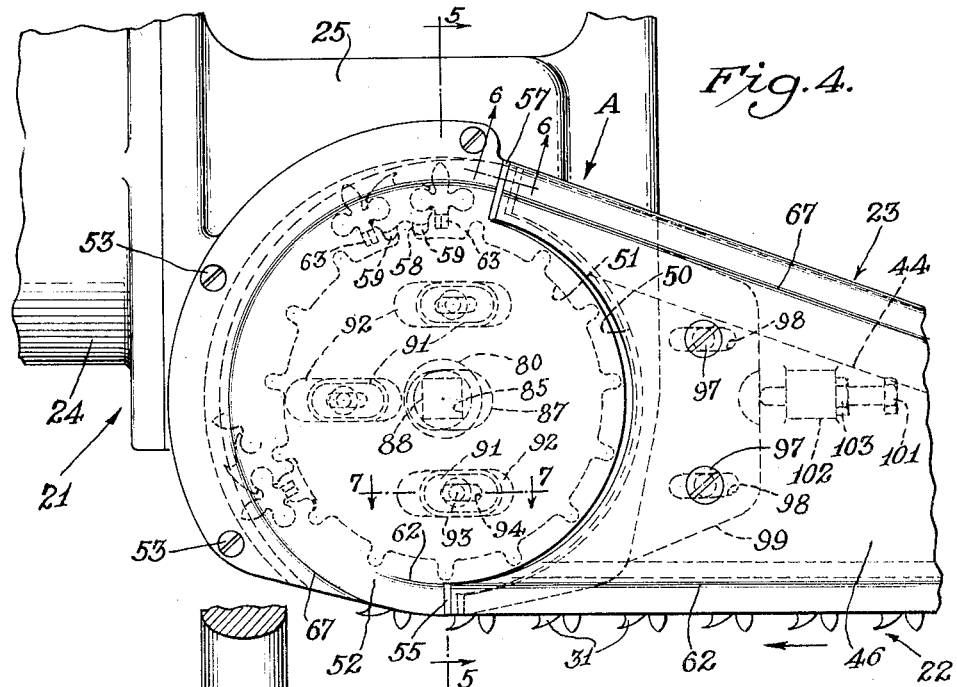
Fig. 4 is an enlarged fragmentary side elevational view showing the driving end of the saw.

Figs. 8, 9 and 10 are greatly enlarged vertical sectional views taken along lines 8—8, 9—9 and 10—10, respectively, of Fig. 1 to show the relationships of the articulated saw tooth units at different points along the saw blade track.

Fig. 11 is an enlarged fragmentary side elevational view of the forward end portion of the saw with one of the side plates removed.

Fig. 12 is an enlarged perspective view of one of the raker tooth units.

Fig. 13 is an enlarged perspective view of one of the cutting tooth sections.

Figs. 14 and 15 are detail sectional views taken substantially in the planes of lines 14—14 and 15—15, respectively, of Fig. 11 to show the relationship of the raker teeth claws and the complementary bevel portions of the cutting teeth at different points in the blade circuit.

While the invention is susceptible of various modifications and alternative constructions, I have shown in the drawings and will herein describe in detail a preferred embodiment, but it is to be understood that I do not thereby intend to limit the invention to the specific form disclosed but intend to cover all modifications and alternative constructions falling within the scope of the claims.

A saw embodying the features of the invention may take the form of a lightweight, portable power actuated unit adapted for easy and convenient handling and operation. The saw blade is made up of an articulated series of easily replaceable raker and cutting tooth units arranged to travel continuously in one direction within a guideway or track formed about the margin of a thin, relatively narrow and elongated stock member. The latter is adjustably secured in forwardly projecting relation to a handle structure which may include a power transmission casing and a motor support and may be equipped with handles and motor controlling means. Only the actual cutting portions of the articulated saw blade, herein at the cutting edge and at the tip or nose of the stock are exposed and the remainder or return run of the blade at the back of the stock is safely enclosed. Moreover, due to a novel construction of the articulated saw blade, the return run has the cutting teeth collapsed and is therefore of such thinness that the closure therefor may be of no greater thickness than the main body of the stock which itself is preferably thinner than the set of the cutting teeth where they are exposed in the cutting run or edge of the saw. This enables the saw to be used for the same purposes as an ordinary hand saw and eliminates such hazards as dragging, pinching or jamming of the return run of the blade. By having the saw blade exposed for cutting at the tip or nose of the stock the saw is adapted to be driven endwise directly into a continuous surface such as a panel, partition, wall, ceiling or floor.

Referring more particularly to the drawings, an exemplary form of power driven portable hand saw embodying the features of the invention may include a generally flat elongated cutting member or section 20 which is supported at one end by a handle structure or section 21. The cutting section 20 comprises an endless chain type of saw blade 22 and means in the nature of a stock 23 providing a guideway or track for the blade for high speed continuous cutting action. The handle section 21 may be constructed in the form of two longitudinally alined and separably connected portions one constituting a motor housing 24 and the other a hollow transmission gear housing 25. Either or both of these housings may be equipped with a convenient hand grip or handle, there being in the present instance a handle 27 on the outer end of the motor housing 24 and a handle 28 on the upper side of the transmission gear housing 25. The handle 28 may be located at substantially the longitudinal center of weight of the saw unit to effect a balanced relationship and facilitate handling of the tool. Although the saw shown herein is of the one-man type, it will be apparent that the features of the invention are readily adaptable to other forms of chain saws.

According to the present invention, the saw blade 22 is preferably formed as a continuous series or closed chain of articulated generally flat tooth units comprising a novel arrangement of alternate raker tooth units 29 and cutting tooth units 30 (Figs. 11, 12 and 13). The construction of the tooth units is such that in the cutting run of the blade the cutting tooth units 30 assume a preferred set wider than the raker tooth units 29 while in the non-cutting run the cutting teeth are adapted to collapse or close to a thickness no greater than the raker units.

Each of the raker tooth units 29 is preferably formed as a flattened somewhat elongated solid body having a suitably proportioned fixed raker tooth 31 along one edge (Figs. 8 and 12). On the other hand, each of the cutting tooth units 30 is preferably formed as a pair of identical, generally flat elongated interchangeable sections 32 cooperatively related in face-to-face relation for opening and closing movement. Each of the tooth sections 32 comprises a cutting tooth 33 extending centrally from one edge of the elongated body of the section and preferably of generally elliptical shape with an outwardly beveled cutting edge 34 and a cutting tip or point 35. The inside or opposed faces of the tooth sections 32 are shaped to slope away from respective longitudinal beads 37 which form opposed fulcrums about which the tooth sections may pivot for opening and closing movement of the cutting tooth unit 30 (Figs. 9 and 13). The pitch of the inner face of the cutting tooth section 32 at opposite sides of the fulcrum bead 37 controls the spread or set of the cutting teeth 33 in the open condition of the cutting tooth unit and the overall thickness of the unit in the closed or collapsed condition. In the collapsed condition, the thickness of the cutting teeth is preferably no greater than the thickness of the raker teeth 31.

By preference the articulate connection between the raker tooth units 29 and the cutting tooth units 30 is in the nature of a flat ball and socket coupling. Accordingly, the ends of each of the cutting tooth bodies 32 are formed in the shape of identical rounded arms 38 which are adapted to fit interchangeably within either one of a pair of identical circular sockets 39 opening endwise from the raker tooth unit 29. Opposed inner and outer jaws 40 and 41, respectively, at the opposite sides of the opening or throatway from each of the sockets 39 are each formed with substantially V-shaped claws 42 adapted to engage the opposite beveled edges of a portion of reduced width or neck 43 at the inside of the connecting arms 38. The neck 43 is narrower than the socket mouth opening between the jaws 40 and 41 to enable limited relative movement of the connected tooth units in the plane of the blade so that the blade can travel about a center. In the preferred arrangement the outer jaw 41 is circumferentially slightly longer than the inner jaw 40 and is adapted to engage the neck 43 when the tooth units are in straight alinement (Figs. 11 and 14), while the inner jaw 40 is adapted to engage the neck 43 during the travel of the blade in a curved path on a relatively small radius (Figs. 11 and 15). In any such engagement, the respective claws 42 engaging the beveled neck edges tend to assist in avoiding lateral displacement and play or looseness of the raker tooth and cutting tooth units. The flat ball and socket connection of the tooth units enables them to be separated or coupled together simply by relative sidewise movement when the respective tooth units are swung in their plane on an inside radius sufficient to clear the neck 43 from the claws 42.

In order to provide the necessary clearance between the edges of the connecting arms 38 and the walls of the sockets 39 for the opening and closing movements of the cutting tooth sections 32, the arms are preferably formed substantially elliptical longitudinally. That is they are of slightly greater dimension longitudinally of the tooth sections. The greatest or longitudinal dimension of the rounded connecter portions of the arms is, however, substantially the same as the diameter of the sockets. While permitting free opening and closing movement of the cutting tooth sections this arrangement assures a close fit longitudinally in the ball and socket couplings and avoids undue slack.

The stock 23 is constructed as an elongated flattened body providing a trackway for the blade 22 along its edges wherein the tooth units are held in a common coupled plane. The trackway includes a cutting run along one edge wherein the cutting tooth units 30 are held open or set for sawing, and a return or non-cutting run along the opposite edge wherein the cutting tooth sections 32 are held collapsed. Accordingly, the stock may be made of suitable plate or sheet metal comprising simply a flat main or body plate 44 and a pair of thin opposite side or cheek plates 45 and 46 secured in any preferred manner flatwise against the opposite faces of the body plate as, for example, by means of screws or rivets 47. The plates are preferably formed with a substantially straight longitudinal edge to accommodate the cutting run of the saw blade and have a relatively wide butt end portion A which tapers forwardly along the back edge of the plates to an elongated narrow shank portion B. This shank is of substantially uniform width and terminates in a rounded nose portion C which tapers slightly outwardly along the back edge to a slightly greater width than the shank portion B.

The cheek plates 45 and 46 are preferably of generally similar complementary form and proportions and are dimensioned to extend marginally beyond all edges of the body plate 44 so as to define the sides of the track for the saw blade 22. Along the straight cutting edge or run of the stock 23 and at the rounded edge of the nose portion C the marginal extensions of the cheek plates are arranged to expose the raker teeth 31 and the cutting teeth 32 for sawing (Figs. 1, 8 and 9). At the back or non-cutting edge of the stock 23 the marginal extensions of the cheek plates are somewhat wider and are preferably turned toward each other into edgewise abutment to form a safety enclosure 48 for the teeth in the return run of the blade 22. The abutment joint may, if desired, be welded closed as indicated at 49. The thickness of the return run enclosure 48 is preferably no greater than the principal thickness of the stock 23, that is, the aggregate thickness of the body plate 44 plus the cheek plates 45 and 46. Furthermore, this thickness is preferably less than the spread or set of the open cutting teeth 33. Thus, the entire stock 23 including the safety enclosure 48 at the back edge may enter freely and with ample clearance into a kerf cut by the saw. This permits the stock to be advanced entirely through a cut with the blade and avoids the necessity for returning the blade back through the cut to clear the work where the severed parts of the work do not fall apart. In large work pieces the kerf may even close up to some extent back of the advancing stock without pinching the latter.

In the preferred arrangement, the edge of the body plate 44 provides the base or bearing surface of the blade track for the cutting run of the saw blade 22 at both the straight and the curved-end margins of the stock 23 (Figs. 1, 10 and 11). At the back margin of the stock 23 however, the edge of the body plate 44 is spaced inwardly enough to clear the return run of the saw blade (Figs. 1 and 8 to 10).

Figure 5:
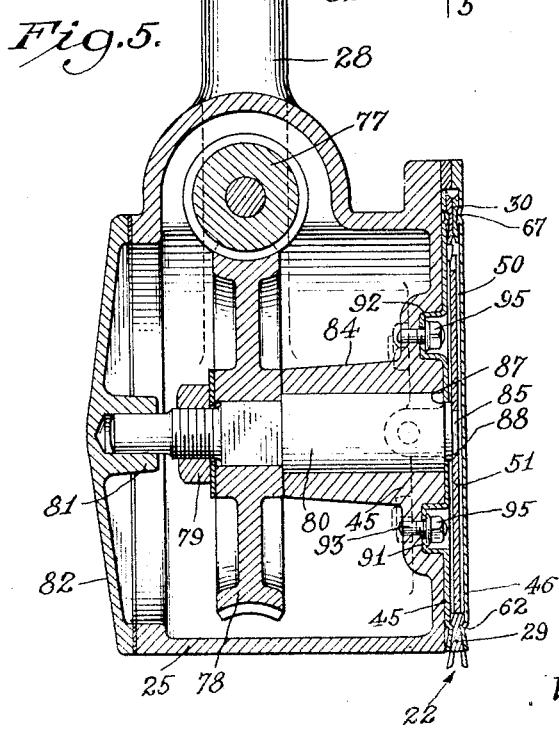
Fig. 5 is a vertical sectional detail view through the power transmission mechanism for the saw taken substantially along line 5—5 of Fig. 4.
Figure 6:
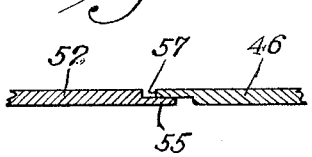
Fig. 6 is a fragmentary detail sectional view taken substantially in the plane of line 6—6 of Fig. 4 and showing the joint between the closure plate for the driving sprocket and the associated cheek plate of the saw stock.

Within the butt end portion A of the stock 23, the body plate 44 is cut away to form a flat chamber 50 between the cheek plates 45 and 46 to receive a thin sprocket wheel 51 for driving the saw blade 22 (Figs. 4 and 5). The sprocket wheel 51 is preferably of substantially greater radius than the rounded part of the track of the nose portion C, sufficient to so relatively dispose the tooth units riding thereover within the chamber 50 as to clear the claws 42 from the necks 43 and enable free lifting out and replacement of the tooth units. To gain access into the sprocket wheel chamber 50, for insertion or removal of the tooth units the butt end extremity of the cheek plate 46 may be formed as a removable closure 52. Along its rear margin the closure 52 may be secured to the adjacent margin of the cheek plate 45 as by means of short, countersunk flat head screws 53, while at its forward margin the closure 52 may be formed with a lap flange 55 (Figs. 4 and 6) forming a lap joint with a complementary flange 57 on the adjoining edge of the body of the cheek plate 46.

In the present instance the spacing between the sprockets of the wheel 51 is such as to engage the raker tooth units 29. Each of the latter is therefore provided along the edge opposite the raker tooth 31 with a central sprocket notch 58 defined by a pair of sprocket-engaging lugs 59 (Figs. 4 and 12). In the cutting run these lugs 59 are adapted to ride within a groove 60 in the bearing edge of the body plate 44 (Figs. 3, 8 and 11) while shoulders 61 at the base of the lugs on opposite sides of the raker tooth body ride upon the bearing edge (Fig. 10). By preference the saw blade 22 is driven by the sprocket wheel 51 in a direction which carries the cutting and raker teeth of the cutting run of the saw blade 22 from the forward or nose end to the rear or butt end of the stock 23.

As the saw blade 22 travels its circuit about the stock 23, the opening and closing movements of the cutting tooth units 30 are controlled by means such as a system of beads formed in the track margins of the cheek plates 45 and 46. Thus, along the cutting run the margin of each of the cheek plates is formed with an identical inwardly pressed longitudinal rib or bead 62, adapted to engage slidably with the base portions of the cutting tooth sections 32 to hold the teeth 33 in the spread or set condition as shown in Fig. 9. It may be noted that the points at which the beads 62 engage the cutting tooth sections 32 are spaced inwardly relative to the fulcrum ribs 37 sufficiently to adequately counteract any tendency of the teeth 33 to close up in the stress and strain of sawing. Forces tending to spread the cutting teeth farther apart are opposed by means acting in cooperation with the beads 62 and the retaining claws 42 of the raker unit jaws 41, and herein comprising a lug 63 projecting inwardly from the base side of each of the cutting tooth sections 32 and dimensioned to provide a pad 64 for engaging a wall of the groove 60.

The beads 62 also serve as means for retaining the saw blade 22 against leaving its track and to this end are adapted to engage slidably within opposite substantially complementary longitudinal grooves 65 in the raker tooth units 29 (Fig. 8). As a result, the raker tooth units 29 are held to the bearing base of the saw track and in turn hold the cutting tooth sections in the track.

At the back edge of the stock 23, the return run of the blade is supported entirely free of the body plate 44 (Figs. 8, 9 and 10) and the cutting teeth 33 are held closed by means such as identical opposed inwardly pressed longitudinal ribs or beads 67. Grooves 68 formed to extend longitudinally of the blade in the side faces of the cutting teeth 33, and longitudinal grooves 69 at the base of the raker teeth 31 are adapted to receive the beads 67. This arrangement of beads and grooves is such as to provide a substantially suspended support for the saw blade within the return run enclosure 48.

The relationship of the blade controlling and supporting beads 62 and 67 is such at the back of the nose portion C as to effect a smooth and relatively quick transition from closed to open or cutting condition of the cutting teeth at the forward end of the return run of the saw blade and at approximately the point where the saw blade begins to run around the nose for endwise sawing. Accordingly, the forward end of the return run enclosure 48 gradually tapers off as indicated at 70 at approximately the juncture of the shank portion B of the stock and the nose portion C and the return run beads 67 taper off and merge into the outer exposed margins of the respective cheek plates (Figs. 1 and 3). As the saw blade leaves the return run beads 67 the cutting tooth lugs 63 enter a tapered approach 71 into the body plate groove 60 whereby the cutting tooth sections 32 are forced open at the same time that the saw tooth units are engaged by the controlling and retaining beads 62 which have a gradual or tapered beginning, as indicated at 72 substantially coextensive with the diminution of the beads 67. Through this arrangement the cutting teeth 33 are fully open or set when the blade reaches the widest portion of the nose portion C and the blade 22 is adapted to cut a slot of such dimensions that the stock 23 may enter freely up to the rear end of the shank portion B.

The rear ends of the cutting run beads 62 terminate where the saw blade enters the chamber 50 to travel with the sprocket wheel 51 (Fig. 4). At approximately the same point the saw blade is engaged by the commencing ends of the return run beads 67. Through this arrangement the tooth units are retained substantially in a given path about the sprocket even in the event of a separating break in the saw blade.

Means for actuating the sprocket wheel 51 may comprise any suitable pneumatic or electrical variety of motor within the housing 24 and having a drive shaft 75 (Fig. 1). A worm 77 mounted within the transmission housing 25 is axially connected to the drive shaft and meshes with a worm gear 78 which is suitably secured as by means of a nut 79 (Fig. 5) to a reduced section of a shaft 80. At its end of reduced diameter, the gear shaft 80 is journaled in an inwardly projecting boss 81 formed upon a cover plate 82 which is removably secured as by means of screws 83 (Fig. 1) in closing relation to one side of the gear housing. The opposite end of the gear shaft 80 extends entirely through a bearing boss 84 which extends inwardly from the opposite side wall of the gear housing. Upon its outer extremity, the gear shaft 80 is formed with a longitudinal projection 85 of rectangular cross section which extends through a slot 87 in the butt portion of the cheek plate 45 and fits snugly within a rectangular axial aperture or socket 88 in the sprocket wheel 51. Through this arrangement, the transmission worm 77 and the gear are wholly enclosed within the housing 25 which may have a supply of gear lubricant sealed therein. Assembly or dismantling of the gears can be effected easily and conveniently by removing the cover plate 82.

Manual operating means for controlling the driving motor may comprise any suitable push button or lever arrangement upon the handle section 21. The arrangement herein is preferably such that accidental operation of the motor is avoided and includes control members 89 and 90 (Fig. 1) in the nature of elongated buttons or levers mounted upon and arranged to be conveniently pressed for operation by grasping the handles 27 and 28, respectively. The control member 89 may be set in slightly protruding relation at the inside face of the handle 27 so that it cannot be accidentally actuated by pressure from an extraneous object against which the handle may come to rest. On the other hand, the control member 90 may be set to protrude slightly from the outside face of the handle 28 in such relation that the tool can be lifted by this handle without actuating the control member until the saw is in cutting position. By preference, the relationship of the control members 89 and 90 is such that they must both be actuated at the same time in order to effect operation of the motor. As a result, it is virtually impossible for the saw to be operated accidentally because of the necessity for deliberate manual pressure upon the control members 89 and 90. Moreover, this arrangement compels the operator to grasp both of the handles 27 and 28 in such a manner that the danger of whipping or throwing of the machine during high speed operation is practically obviated.

Figure 7:
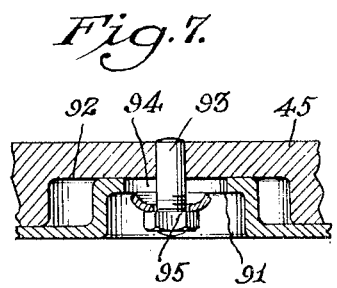
Fig. 7 is a fragmentary sectional view taken along line 7—7 of Fig. 4, showing details of the connection between the transmission casing and the saw stock.

The means for securing the stock 23 to the handle section 24 is preferably such as to permit longitudinal adjustment of the stock relative to the sprocket wheel 51 in order to control the tension of the saw blade 22. Accordingly, the butt end portion of the cheek plate 45 may be formed with a plurality of short generally triangularly related and longitudinally extending pressed ribs 91 which are arranged to fit snugly within complementary grooves 92 formed in the adjacent face of the transmission housing 25 (Figs. 4 and 7). The grooves 92 are preferably somewhat longer than the ribs 91 to permit limited relative longitudinal sliding movement to enable the blade-tensioning adjustment referred to. Short studs 93 project from the grooves 92 through slots 94 in the ribs 91 and receive lock nuts 95 by which the cheek plate 45 is secured in place.

Additional means for securing the stock 23 to the handle section 21 may comprise a pair of stud bolts 97 (Figs. 1, 2 and 4) which project fixedly entirely through the stock adjacent to the forward end of the handle section and through longitudinal slots 98 formed in a forwardly projecting attachment lug or ear 99 on the gear housing 25. Nuts 100 upon the bolts 97 may be tightened down to secure the stock and handle sections in the preferred adjusted relationship wherein the blade 22 is properly tensioned.

Means for determining and permanently maintaining such preferred blade-tensioning adjustment may comprise an adjusting screw 101 threaded through a lug 102 provided for this purpose on the cheek plate 45. The adjusting screw 101 bears endwise against the forward edge of the attachment lug 99 and is adapted to be secured in any adjusted condition by a lock nut 103.

From the foregoing it will be apparent that the present invention provides a new and improved chain type saw construction which is adapted for many and varied uses. The novel collapsible cutting tooth arrangement permits the return run of the saw to move within such limited space that the entire thickness of the saw blade and stock structure may be thinner back of the cutting run of the blade than the set of the saw teeth. The saw may be constructed as a small portable hand operated unit adapted for ordinary straight cutting and also for endwise cutting. Moreover, the preferred arrangement is particularly safe in construction and in use. The articulated saw blade cannot leave its track but is held therein even though any portion of the blade should break or become separated. The various parts of the saw are adapted to be constructed from easily made and readily available inexpensive parts so that the tool may be manufactured at a reasonable cost.

I claim as my invention:

1. In a chain type power saw construction, a cutting tooth section comprising a generally flattened body, a cutting tooth projecting integrally from one edge of the body, and a fulcrum rib along one face of the body extending transversely of the cutting tooth and adapted to engage the similar fulcrum rib of an opposed tooth section to enable rocking of the sections and relative opening and closing movement of their cutting teeth.

2. A saw construction comprising, in combination, an articulated saw blade including a plurality of relatively movable tooth units, means in the nature of a flat ball and socket connection for separably connecting said units permitting any tooth unit to be removed by a simple separating motion sidewise of the direction of cutting movement of the blade and without disturbing adjacent units, means providing a guideway for said blade to hold the tooth units against separation, and a removable closure for a part of the guideway adapted to be opened for access to said blade for removal or replacement of selected tooth units.

3. In combination in a power saw, an endless chain type of saw blade, and means providing a trackway within which said blade is located for longitudinal travel, said trackway including a cutting run length and a return run length, said blade including cutting teeth comprising relatively movable sections each of which includes a body having a tooth portion on one side and an oppositely extending lug on the opposite side, means in the cutting run length of the trackway engaging with the lugs of said tooth sections for holding the sections open in cutting relation, and means on the trackway means effective in the return run length of the trackway for engaging the tooth portions of the teeth to hold the tooth sections closed.

4. In combination in a power saw, a chain-type articulated saw blade including raker and cutting tooth units, each of the cutting tooth units including a pair of tooth sections each of which has a tooth portion and a base portion, the cutting tooth sections being fulcrumed intermediate their base and tooth portions to rock relative to one another into an open condition wherein the tooth portions are spread apart and a closed condition wherein the tooth portions closely approach one another, the spread of the tooth portions in the open condition being greater than the width of the raker teeth while, in the closed condition, the combined thickness of each pair of cutting tooth portions approximates the width of the raker tooth units; and means for guiding the saw blade in a circuit, including means for engaging the cutting tooth sections at the base sides of their fulcrums for holding the tooth sections open in a cutting run and means for engaging the tooth sections at the tooth portion sides of their fulcrums to hold the teeth closed in the return run of the blade.

5. In combination in a power saw, an articulating saw blade including cutting tooth units comprising pairs of separable cutting tooth sections cooperatively related to rock open and closed to assume an adequate cutting relation when open and to assume a collapsed condition when closed wherein the lateral distance between the cutting teeth outer edges is substantially less than in the open cutting condition thereof, means for guiding the saw blade in a continuous circuit including a cutting run and a return run, and means for driving the saw blade, said guiding means including a body plate having an edge along which the saw blade runs in the cutting run, opposing unitary cheek plates secured against the opposite faces of the body plate and having their margins extending substantially beyond the cutting run and return run edges of the body plate to define a cutting run channel and a return run channel, respectively, beads formed in the extending margins of the cheek plates to engage the tooth sections in the cutting run in such manner as to retain them open, and to engage the tooth sections in the return run in such a manner as to hold the tooth sections closed, the cutting run margins of the cheek plates being substantially narrower than the height of the cutting teeth so that the latter project therebeyond, and the return run margins of the cheek plates extending substantially beyond the teeth and having the edges thereof directed into abutting opposition to entirely enclose the return run of the blade.

6. In combination in an articulated power saw blade, alternate raker and cutting teeth units, the cutting teeth units comprising respective pairs of rockably related tooth sections, each tooth section having a pair of oppositely extending connecter arms attached to the body of the section by a neck of reduced width, each of the raker teeth having an oppositely opening pair of sockets of circular outline for interconnectingly receiving the connecter arms of the adjoining alternating cutting teeth, said connecter arms being of elliptical profile dimensioned to engage fairly closely within the sockets longitudinally of the blade but to afford ample clearance transversely of the sockets so that while the teeth are held against any appreciable relative movement longitudinally of the blade the respective pairs of cutting tooth sections can rock freely relative to one another and to the raker teeth within certain limits in opposite directions laterally of the blade.

7. A chain type saw blade comprising, in combination, a plurality of separable alternate raker and cutting tooth units, each of the cutting tooth units including a plurality of cutting elements relatively movable laterally of the blade into open cutting and closed non-cutting position, and means in the nature of a flat ball-and-socket connection including interconnecting structures on the raker and cutting tooth units for separably connecting said units against separation longitudinally of the blade, said interconnecting structures being constructed for relative movement in the plane of the blade to permit swinging of the interconnected tooth units in said plane and enable the blade to travel about a center, said interconnecting structures being separable laterally of the plane of the blade so as to permit any tooth unit to be removed by a simple separating motion laterally of the plane of the blade and without disturbing adjacent units, said interconnecting structures having means co-operable when the blade is traveling about such center to hold said plurality of cutting elements in one of said positions.

8. A saw of the character described comprising, in combination, a power section, an elongated flattened blade section projecting from said power section, chain type cutting means operatively supported for travel edgewise about said blade section, means forming a driving connection between said power section and said cutting means, said blade section being thinner than the cutting width of said cutting means, means on said blade section for controlling said cutting means to be of effective cutting width along one longitudinal edge of the blade section and narrower along the opposite edge than the thickest portion of the blade section between the edges so that the blade section may pass freely through a kerf cut in an object and without any interference from the cutting means along said opposite edge, and guard means protectively interposed between all of the blade along said opposite edge and the walls of the kerf, said guard means and the adjacent protected portion of the blade being of an overall thickness less than the cutting width of the blade.

9. In a chain type power saw construction, a cutting tooth unit adapted to cooperate with other tooth units in a power driven articulated saw blade to travel an endless circuit trackway including a cutting run and a return run for the blade, said cutting tooth unit comprising a pair of complementary individually formed sections each of which has a body portion and a cutting tooth extending from the body portion cooperatively positioned with respect to the cutting tooth of the companion section to enable concurrent saw cutting action, and structure extending from the body portion of each section to the body portion of the companion section and into direct physical bearing contact with the body portion of the companion section and providing a fulcrum for rocking pivotal motion of the sections relative to one another about an axis disposed parallel to the direction of movement of the tooth unit when travelling in the blade, so that the tooth sections can be rocked to move the cutting teeth apart into saw cutting relation for the cutting run and rocked into mutually closely approaching non-cutting relation for the return run.

10. In combination in a chain type power saw construction an articulated saw blade comprising individual tooth units cooperating in endless chain fashion, means providing an endless circuit trackway including a cutting run and a return run for the blade, and means for driving the blade in the trackway, certain of the tooth units being formed as cutting teeth each comprising a pair of complementary individually formed sections each of which has a body portion and a cutting tooth extending from the body portion cooperatively positioned with respect to the cutting tooth of the companion section to enable concurrent saw cutting action, said pairs of cutting tooth sections having structure extending from the body portion of each section to the body portion of the companion section and into direct physical bearing contact with the body portion of the companion section and providing a fulcrum for rocking pivotal motion of the sections relative to one another about an axis disposed longitudinally of the direction of movement of the blade in the trackway, said trackway means including structure engaging the outer surfaces of the tooth sections adjacent to said fulcrum structure for rocking the tooth sections and moving the cutting teeth apart for saw cutting in the cutting run and for rocking the sections to move the cutting teeth into relatively closely approaching non-cutting relation in the return run, and said trackway structure in such runs holding the tooth sections in the respective relationships as aforesaid.

11. A chain type power saw construction as defined in claim 10, further characterized by the following: each of the cutting tooth sections having a lug member extending from the body portion thereof in the opposite direction from the cutting tooth of the respective sections, and bearing surfaces in the trackway extending longitudinally of the cutting run arranged to be engaged by the lug members to limit spreading apart of the cutting teeth beyond a certain limit and to oppose forces tending to spread the teeth further apart than said limit when sawing.

12. In combination in a chain type power saw construction, an articulated saw blade comprising individual raker and cutting tooth units cooperating in endless chain fashion and adapted to be driven about an endless circuit trackway including a cutting run and a return run, the raker teeth and the cutting teeth being uniformly alternated throughout the endless blade, the cutting tooth units each comprising a pair of complementary individually formed sections each of which has a body portion and a cutting tooth extending from the body portion and cooperating for joint cutting action with the cutting tooth of the companion section, each pair of cutting tooth sections having structure extending from the body portion of each section to the body portion of the companion section and into direct physical bearing contact with the body portion of the companion section and providing a fulcrum for rocking pivotal motion of the sections relative to one another about an axis extending longitudinally of the direction of blade travel so that the tooth sections can be rocked to move the cutting teeth apart into saw cutting relation for the cutting run and rock into mutually closely approaching non-cutting relation for the return run, each cutting tooth section having a pair of oppositely extending connecter arms attached to the body of the section by a neck of reduced width, each of the raker teeth having an oppositely opening pair of sockets for interconnectingly receiving the connecter arms of the adjoining alternating cutting teeth, the dimensional relationship of the connecter arms and the sockets being such that while the teeth are held against any appreciable relative movement longitudinally of the blade, the respective pairs of cutting tooth sections can rock freely relative to one another and to the raker teeth within certain limits in opposite directions laterally of the blade as and for the purposes aforesaid with respect to the cutting and return runs.

13. In combination in a chain-type power saw, an articulated blade, means for driving the blade in one direction, and a stock having a rounded end and including a track for the blade, said track including a straight cutting run, a return run, an arcuate cutting portion joining the return and cutting runs around said rounded end, said track being depressed inwardly throughout a substantial section of the return run to such an extent below the adjacent perimeter of the arcuate track portion that the width of the stock throughout the major portion of the return run of the blade is substantially less than the effective diameter of said arcuate cutting portion of the track whereby to enable free entry of the stock and the return run of the blade into a slot cut by the teeth of the arcuate cutting portion, the track sloping gradually from the depressed section to the arcuate track portion to ease the blade smoothly from the depressed section onto the arcuate portion, and means engaging and holding the traveling return run of the blade to said inwardly depressed track section.

14. In combination in a chain-type power saw an articulated blade comprising alternate raker and cutting teeth units, the cutting teeth units each comprising a pair of rockably related tooth sections constructed and arranged to have the effective cutting portions thereof spread apart to an extent affording an effective cutting width greater than the width of the raker teeth and to be collapsed together to a collapsed width which is approximately the same as the width of the raker teeth, a stock of a thickness not substantially greater than the thickness of the raker teeth and less than the cutting width of the cutting teeth units, said stock having a track for the blade including a straight cutting run track portion, a return run track portion and an arcuate forward cutting portion joining the return and cutting run portions, and said stock having a width less throughout a substantial section of the return run portion than the effective diameter of the blade on the arcuate track portion, means for holding the cutting teeth units open in cutting relation in the rounded forward end portion and the cutting run portion of the track, means for holding the cutting teeth units closed in non-cutting relation in the offset return portion of the track and entirely enclosing the blade in such offset return portion so as to prevent interference with the cutting action of the blade when the blade and stock are projected through a slot cut into a surface by means of the arcuately traveling portion of the blade at the forward arcuate portion of the track, and means for driving the blade about the track.

15. In combination in an articulated power saw blade of the character described, cutting tooth units each comprising a pair of sections assembled to rock laterally relative to one another so as to be rocked open for sawing travel and to be rocked closed for non-sawing travel, each section including oppositely extending connecter arms of rounded profile joined to the section by respective reduced width necks, the arms of the companion sections lying together in matched relationship in the assembly, and raker tooth units separating the cutting tooth units and having open mouthed sockets to receive the matched connecter arms of the respectively adjoining cutting tooth units, and jaws defining the mouths of the sockets to engage said necks and hold the cutting tooth sections substantially steady in the blade.

16. A saw blade as defined in claim 15 in which the arm-joining necks are bevel edged and the raker tooth jaws are formed with claws, the disposition of the jaws being such relative to the necks that when the teeth are in straight alignment in the blade, the claws of the jaws on one side of the necks engage the latter and when the blades describe a radius the jaws on the opposite side of the necks enter into engagement with the necks.

17. In combination in a chain-type power saw of the character described, an endless chain type saw blade comprising individual tooth units alternate ones of which have connecter arms of rounded profile joined to the body portions of such units by necks of reduced width, the remaining tooth units having open mouthed sockets to receive the connecter arms, jaws defining the mouths of the sockets and interlockingly engaging the connecter arms to hold the tooth units against separation longitudinally of the blade, the jaws on one side of the socket mouths having means thereon interengaging with the necks to hold the units against separation laterally of the blade when the blade is traveling in a straight run and the jaws on the opposite side of the socket mouths being disposed to interlock with the necks to hold the tooth units against lateral separation when the blade describes a predetermined minimum radius, said jaws being so related to each other and to the necks that when the blade describes a predetermined larger radius the jaws on both sides remain out of interlocking relation to the necks to permit lateral displacement of the tooth units relative to one another, and means providing a trackway for the blade including a straight cutting run, a return run, an arcuate run joining the cutting and return runs, one of said arcuate runs being of said predetermined minimum radius and the other of said return runs being of said predetermined maximum radius, said trackway having means at said run of maximum radius for normally retaining the tooth units against lateral displacement but being constructed and arranged to be opened for removal or replacement of the tooth units.

WILLIAM H. DEACON.